Feb. 15, 1955  J. W. CLARK  2,702,236
LIQUID-LIQUID CONTACTING DEVICE
Filed Nov. 23, 1953  2 Sheets-Sheet 2

INVENTOR.
J. W. CLARK
BY
ATTORNEYS

United States Patent Office 2,702,236
Patented Feb. 15, 1955

2,702,236

LIQUID-LIQUID CONTACTING DEVICE

Joseph W. Clark, Borger, Tex., assignor to Phillips Petroleum Company, a corporation of Delaware Application November 23, 1953, Serial No. 393,791

10 Claims. (Cl. 23—270.5)

This invention relates to apparatus of improved design for carrying out intimate contacting between immiscible liquids. In one aspect it relates to packing apparatus of improved design for use in liquid-liquid extraction columns.

An object of my invention is to provide liquid-liquid contacting apparatus of improved design for use in liquid-liquid extraction vessels.

Another object of my invention is to provide liquid-liquid contacting apparatus wherein the cross sectional area of an extraction column is more efficiently utilized.

Still another object of my invention is to provide a liquid-liquid contacting apparatus which utilizes more effectively than with conventional apparatus the height of the liquid-liquid extraction vessel.

Still other objects and advantages of my invention will be realized upon reading the following description which taken with the attached drawing, respectively describes and illustrates preferred embodiments of my invention.

I achieve these and other objects by providing alternate assemblies of horizontally disposed perforate plates and vertically disposed assemblies of perforate cylinders. By the use of these alternate assemblies, the lower specific gravity liquid flowing generally up the column passes from the center of the column to the column wall by passing through the assemblies of perforate plates and at right angles to the generally downward flowing heavy phase. The low specific gravity liquid then flows from the walls of the column toward the center through the assemblies of perforate concentric cylinders at right angles to the generally downwardly flowing heavy phase. In this manner cross sectional area of the column is efficiently utilized in the contacting between the heavy phase and the light phase.

Figure 1:
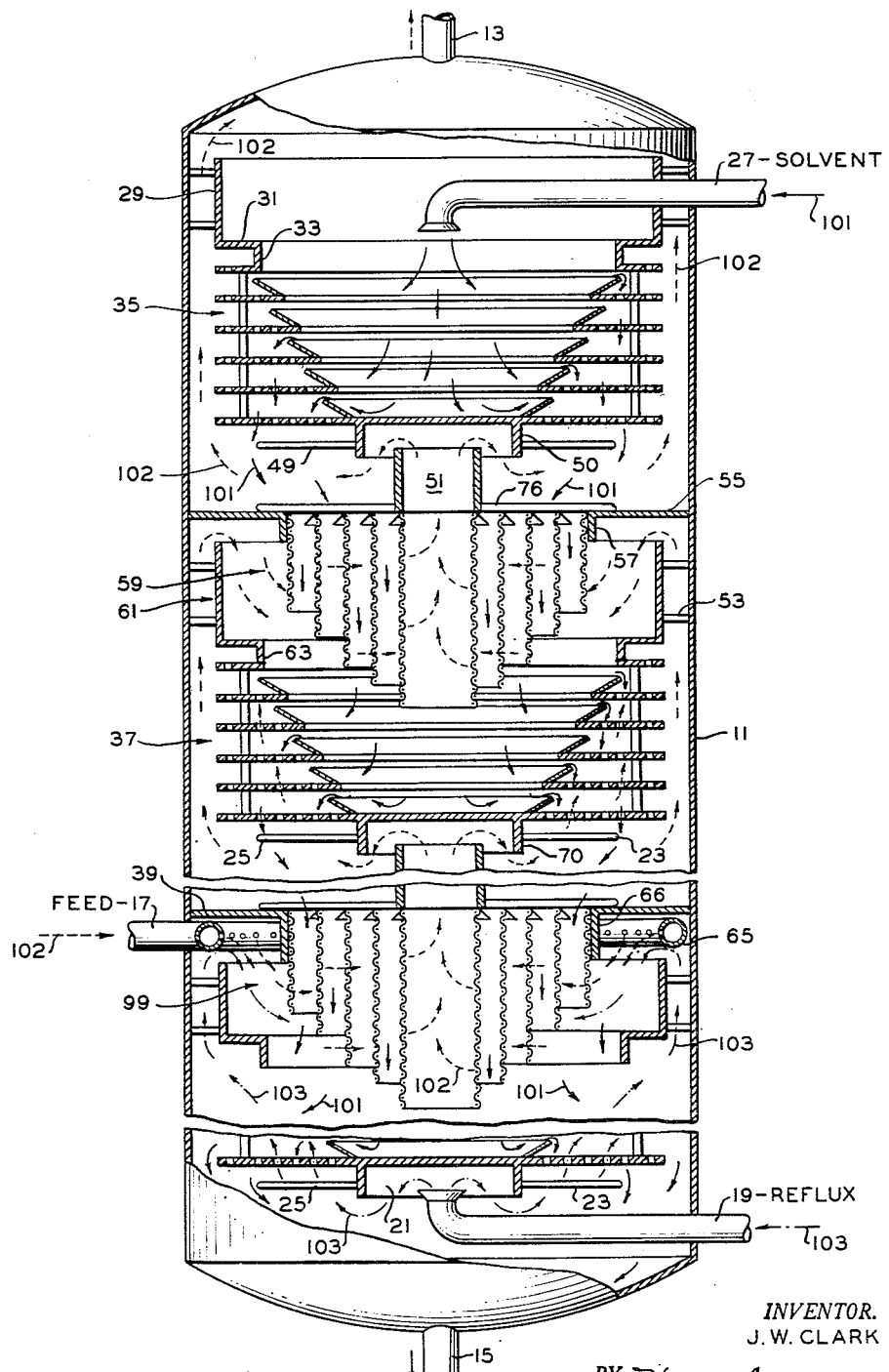
Figure 1 illustrates diagrammatically an elevational view, partly in section, of my liquid-liquid contacting apparatus.

Referring now to the drawing and specifically to Figure 1, reference numeral 11 identifies a vertically disposed cylindrical vessel provided with the interior liquid-liquid contacting apparatus of my invention. A pipe 13 is provided at the top of the vessel for removal of the light liquid phase and pipe 15 is provided at the bottom of the vessel for removing the heavy liquid phase. A feed inlet line 17 is provided at an intermediate point of the vessel for introduction of a liquid charge stock to be contacted with a second liquid.

In describing one embodiment of my invention, I will describe, for exemplary purposes, my apparatus when arranged in the treating vessel for the extraction of a liquid feed with an extraction solvent which is specifically heavier than the feed material. In this case the relatively heavy solvent is introduced into the column through a solvent introduction line 27 and the extract phase is removed through the bottom product withdrawal line 15. The liquid material to be extracted is, of course, introduced through the feed line 17 and the insoluble portion of this feed moves generally upward through the portion of the column above the feed line and the final solvent insoluble phase is removed as raffinate through the line 13.

The liquid-liquid extraction apparatus of my invention is equally useful for extracting soluble constituents from a feed stock when using a selective solvent which is specifically lighter than the feedstocks being extracted. In this case, it is merely necessary to invert the entire contacting equipment within the tower. One simple method of considering treatment of liquids with a specifically light solvent is merely to turn the packed contacting tower upside down, into which then is introduced the specifically light solvent through pipe 27 and the relatively heavy feedstock is introduced through pipe 17.

As mentioned, however, I will describe the operation of my contacting equipment utilizing the specifically heavy solvent and the specifically light feedstock. An assembly of concentrically arranged perforate cylindrical members 59 is constructed as illustrated on an enlarged scale in Figure 2. The assembly of cylinders illustrated in Figure 1 contains five cylinders but can be made with more than 5 or less than 5, as desired. The several cylinders (Figs. 1 and 2) are supported by attachment to one or more cross rods 76. On the underside of the cross rods and at the upper edges of the several cylinders are provided conically shaped baffles 75, 79, 80 and 80a. While baffles 75, 79, 80 and 80a are illustrated as being of frusto-conical form, in some instances it is preferred that these baffles be curved in the direction of liquid flow so as to provide more nearly streamlined flow of the generally downward flowing liquid into the annular spaces between successive cylindrical screens 67, 68, 69, 104 and 105. These baffles are for the purpose of increasing the velocity of liquid flowing downward through the concentric screens so that low specific gravity liquid cannot rise upward before it reaches the central cylinder of the assembly. The assembly of cylinders with the support rod 76 is inserted into the column as illustrated with the ends of the rod or rods 76 resting on a non-perforate annular plate member 55. This plate member is, of course, attached rigidly at its outer circumference to the inner walls of the vessel 11. On the underside of the inner edge of this annular plate is rigidly fixed a short cylinder member 57 which acts as a baffle member, the operation of which, will be described subsequently. Surrounding the assembly of perforate cylinder members is a baffle member 61 of circular cross section. This baffle member 61 is attached to the walls of the vessel by supports 53 with the top edge of the large diameter section being at about the same level as the bottom edge of the short cylinder 57. The lower end of the baffle member 61 is of smaller diameter than that of the main portion of the baffle and is defined by a short cylinder element 63. Disposed immediately below this short cylinder 63 is an assembly of horizontally disposed perforate annular plates 37 with the several plates of this assembly having different inner diameters. The uppermost of the several perforate annular plates has the largest inner diameter, with the diameter of successively lower plates being reduced in size. An assembly of such horizontally disposed perforate plates is illustrated in Figure 3. Reference numerals 81, 82, 83, 84, 85 and 86 identify the perforate plates while the perforations are identified by reference numerals 93. Support rods 91 are attached to the several perforate plates for holding them at spaced distances apart as shown. The opening in the center of plate 82 is surrounded by a conical baffle member 89, and the openings in the remainder of the plates are surrounded by similar baffle members 95, 97, 96, and 98. These conical members are intended to increase the velocity of liquid flowing in the direction indicated by the arrows (Figure 1) so that the upflowing liquid cannot pass in a direction opposite to the arrows. Such an assembly of horizontally disposed perforate plates is installed into the column immediately below the short open cylinder 63 in such a manner that the bottom edge of the cylinder 63 fits tightly against the edge of the opening in the uppermost of the perforate plates. Of course, as illustrated in Figure 1, the uppermost of these perforate plates is not provided with a conical baffle member similar to those mentioned and illustrated in Figure 3. This upper plate of the assembly of plates is attached rigidly to the lower edge of the cylinder 63 by welding or such other means as desired. Into the central opening of the bottom perforate plate is disposed an inverted cup 70. This cup is intended to entirely fill the opening in this lower plate so that liquid from below cannot pass upward through the series of central plate openings. If desired, this inverted cup can be attached to the lower perforate plate by welding or the cup may be attached to the walls of the vessel by support rods 23 and 25. These assemblies of perforate cylinder members and perforate plates constitute a complete unit of my contacting apparatus and as many of these double units of contacting apparatus can be used in a treating vessel as desired. When the solvent used in the extraction operation is specifically heavier than the material being extracted I install an assembly of the horizontally disposed perforate plates nearest the top of the column and immediately below the point of introduction of solvent. In this case, an upper assembly of perforate plates and the next lower assembly of concentric cylinders are considered as an apparatus unit. To assist in separating final raffinate a baffle assembly composed of parts 29, 31 and 33 is disposed as illustrated near the top of the vessel. This baffle assembly is similar to baffle assembly 61 described hereinbefore.

A short tube 51 is attached to the upper end of the central cylinder of the assembly of perforate cylinders and leads vertically into the opened end of the inverted cup 50 disposed immediately below the assembly of plates 35. This inverted cup is intended to prevent the specifically heavy solvent from entering tube 51 and flowing in a reverse direction from that desired. This tube 51 can be attached rigidly at its lower end, if desired, to the upper end of the inner perforate cylinder of assembly 59. This assembly of cylinders 59 is supported by one or more rods 76. These rods are supported on the nonperforate annular plate member 55.

In the lower portion of the vessel is provided additional assemblies of plates and cylinders for completing the contacting operation. A pipe 19 is shown entering column 11 at a level near the bottom for the addition of reflux in case the extract of the extraction operation is refluxed. Reflux material is introduced through the pipe 19 into an inverted cup 21 similar to cup 50 as mentioned above. Since the reflux material is specifically lighter than the solvent and extract phase the reflux material will underflow the lower rim of this cup 21 and will flow, in general, upwardly through perforations in the lower perforate plate assembly. This cup 21 is illustrated being attached to the walls of the vessel by rods 23 and 25.

The feed introduction pipe 17 is illustrated as entering column 11 at a level immediately below an annular nonperforate plate member 39. Since this operation is being explained for extracting a specifically light feedstock when the feed enters the column and is distributed by a feed line 65 the specifically light feed rises to the underside of the non-perforate ring 39. When this portion of the column is filled with feed, the feed then underflows a ring 66 and travels from the perforate cylinder of largest diameter to the perforate cylinders of smallest diameter while solvent which is specifically heavier follows the direction of the downwardly pointing arrows between the concentric cylinders. Thus the feedstocks and the solvent are contacted with each other while traveling the right angles which type of contacting is generally considered to be very efficient.

In the drawing, the solid arrowed lines represent the direction of flow of the solvent and extract phase while the dotted arrowed lines represent the direction of flow of feedstock and raffinate phases and the dot and dash arrowed lines represent the direction of flow of reflux.

Figure 4:
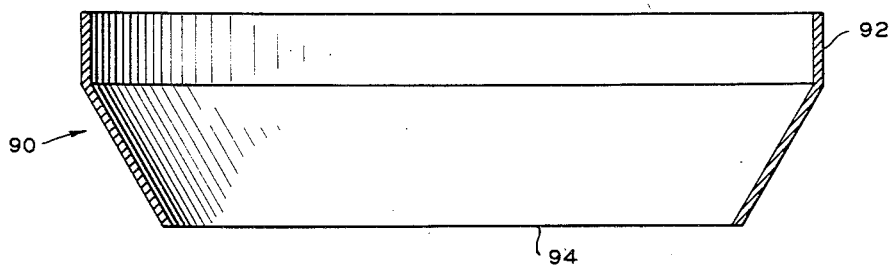
Figure 4 illustrates in sectional elevation an alternate portion of one member of my apparatus.

In place of the generally circular baffle assembly 61 as illustrated in Figure 1 and described above, I can use another shape of baffle illustrated in Figure 4 as element 90. This type of baffle is composed of a short vertical cylinder portion 92 and a conical portion 94. When this latter type of baffle is used in my contacting assembly the lower edge of the conical baffle 94 fits tightly against the rim of the inner diameter of the upper horizontal plate member of an assembly of plates. Either one of these circular baffle assemblies works equally well but I prefer such an assembly as identified by reference numeral 61 in Figure 1 since it is simpler to manufacture.

Figure 2:
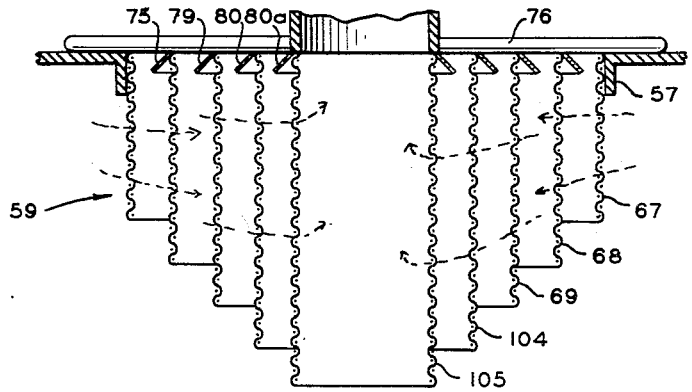
Figure 2 is a longitudinal sectional view of a portion of the apparatus of Figure 1.
Figure 3:
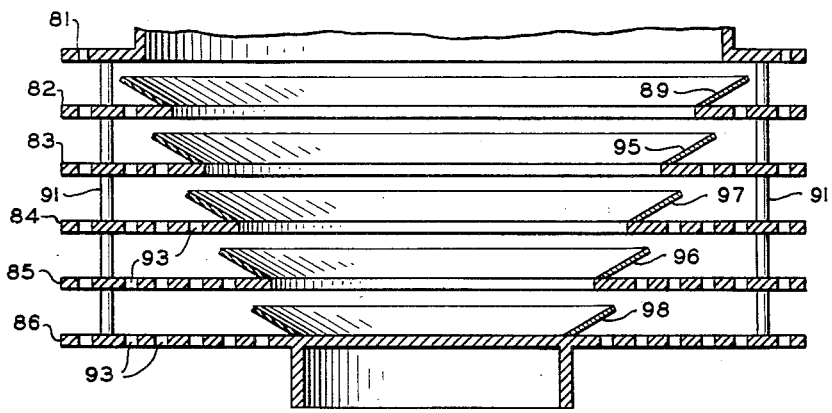
Figure 3 is a sectional view of another portion of the apparatus of Figure 1.

The several cylindrical screens illustrated in Figure 2 are individually identified by reference numerals 67, 68, 69, 104 and 105. This portion of apparatus illustrated in Figure 2 is intended to be a showing on an enlarged scale of the cylinder assembly 59 illustrated in situ in the extraction vessel 11. The lengths of these cylinder members are so selected with respect to their diameters that the areas of the perforate cylinders are equal so that the liquid being extracted and following the broken arrowed lines in Figure 2 will have equal opportunities for contacting the downflowing heavy solvent, the direction of which is illustrated by the arrowed solid lines. As illustrated in Figure 2, the largest diameter screen is attached to the cylindrical baffle 57 and this screen is not provided with a conical baffle as are screens 68, 69, 104 and 105.

In the specific operation of the apparatus of Figure 1 wherein a heavy solvent is introduced through line 27 and the light feedstock is introduced through line 17, this feedstock is distributed by the distributor ring 65 and the feed flows in droplet form through the perforate cylinders into the cylinder of smallest diameter. Heavy solvent cannot enter this cylinder of smallest diameter and therefore, specifically light material being extracted rises upward through this inner cylinder to the spaces below an inverted cup. This material underflows the edges of the cup and then flows upwardly through perforations in the assembly of perforate plates while down flowing solvent flows radially between the perforate plates to contact the generally up flowing liquid. The liquid droplets reaching the top of the assembly of perforate plates follow an annular path upward along the walls of the vessel 11 to the underside of, for example, a nonperforate plate 55. The liquid which reaches this point then underflows the collar 57 to start generally horizontal travel through a second assembly of perforate cylinders to repeat the operation just described.

The perforate cylinders of my cylinder assemblies can be made of a reasonably finely woven heavy wire so that the screens will have relatively small openings and yet be mechanically strong. These perforate cylinders may, if desired, be punched plates with a sufficient large number of openings as to provide a large ratio of openings. In like manner, the horizontally disposed annular perforate plates may also be woven mesh screens or they may be punched plates as illustrated in Figure 3.

Materials of construction of the element parts of my contacting apparatus are, in general, selected from among those commercially available. Account should, of course, be taken as to the corrosive nature of any materials undergoing treatment. The apparatus of my invention is applicable to such extraction operations as the solvent extraction of lubricating oils and in fact most any extraction or contacting operations in which it is desired to contact two immiscible liquids in the absence of a vapor phase.

While certain embodiments of the invention have been described for illustrative purposes, the invention obviously is not limited thereto.

I claim:

1. Apparatus for the countercurrent contacting of a pair of immiscible liquids of unlike specific gravities, comprising, in combination, an elongated vertically disposed vessel of generally circular cross section, an assembly of vertically spaced horizontally disposed perforate annular members in said vessel, an assembly of horizontally spaced perforate concentric cylindrical members disposed below said assembly of horizontal members, the axis of said cylindrical members being arranged substantially vertically, an inverted cup closing the central opening of the lowest of said perforate annular members, a conduit leading from the upper end of the cylindrical member of smallest diameter to the space within said inverted cup, a baffle disposed around the inner circumference of each of said horizontally disposed annular members, a baffle disposed around the top end of each of said concentric cylindrical members, a nonperforate annular baffle plate forming a seal between the upper end of the outer cylindrical member of said assembly of concentric cylindrical members and the inner wall of said vessel, means to introduce one of said liquids at a level near one end of said vessel, means to introduce the other liquid at a level intermediate the level of introduction of said one of said liquids and the other end of said vessel and means to withdraw products from the ends of said vessel.

2. The apparatus of claim 1 wherein the perforate cylindrical members of the assembly of perforate concentric cylindrical members have equal surface area.

3. The apparatus of claim 1 wherein the inner diameter of each successively higher positioned perforate annular member of said perforate annular assembly is greater than that of the next lower perforate annular member.

4. An apparatus for contacting a pair of immiscible liquids of unlike specific gravities, comprising, in combination, an elongated vertically disposed vessel of generally circular cross section, a plurality of assemblies of vertically spaced horizontally disposed perforate annular members disposed at fixed intervals throughout the length of said vessel, an assembly of perforate concentric cylindrical members disposed below each assembly of spaced horizontally disposed perforate annular members, the axes of said assemblies of perforate annular members and the assemblies of concentric cylindrical members being positioned along the axis of said vessel, a separate inverted cup filling the central opening of the lowest of said perforate annular members in each assembly, a separate conduit leading from the upper end of each of the cylindrical members of smallest diameter of said assemblies of cylindrical members to the space within the inverted cup next higher up the vessel, a separate baffle disposed around the inner circumference of each of the horizontally disposed annular members of said assemblies of annular members, a separate baffle disposed around the top edge of each of the concentric cylindrical members of said assemblies of concentrical cylindrical members, a separate nonperforate annular baffle plate forming a seal between the upper end of the outer cylindrical member of each assembly of concentric cylindrical members and the inner wall of the vessel, means to introduce one of said liquids at a level near one end of said vessel, means to introduce the other liquid at a level intermediate the level of introduction of said one of said liquids and the other end of said vessel and means to withdraw products from the ends of said vessel.

5. The apparatus of claim 4 wherein each perforate cylindrical member of each assembly of perforate cylindrical members has a surface area equal to that of the surface area of each other cylindrical member of its assembly.

6. The apparatus of claim 4 wherein the inner diameter of each successively higher positioned perforate annular member of each assembly of perforate annular members is larger than the inner diameter of the next successively lower positioned perforate annular member.

7. Apparatus for the countercurrent contacting of a pair of immiscible liquids of dissimilar specific gravities, one liquid of said pair of liquids being the major constituent and the other liquid of said pair of liquids being the minor constituent, comprising, in combination, an elongated, vertically disposed vessel of generally circular cross section, means to introduce said major constituent into said vessel at a level near one end thereof, means to introduce the minor constituent into said vessel at a level intermediate the other end of said vessel and the introduction level of said major constituent, an assembly of vertically spaced horizontally disposed perforate annular plates in said vessel, an assembly of horizontally spaced perforate concentric cylindrical members disposed intermediate said assembly of annular plates and said other end of said vessel, a cup having one end open and one end closed, the closed end of said cup filling the opening in the vertically spaced perforate horizontal plate of the assembly of vertically spaced horizontally disposed perforate annular plates nearest said assembly of cylindrical members, the open end of said cup facing said assembly of cylindrical members, a conduit leading from the cylindrical member of smallest diameter of said assembly of cylinders into the open end of said cup, a nonperforate annular baffle plate disposed intermediate the inner wall of said vessel and the end of the perforate cylinder of largest diameter nearest said cup to form a seal between said cylinder of largest diameter and the inner wall of said vessel, and separate means to withdraw liquids from either end of said vessel.

8. In the apparatus of claim 7, an additional means near said other end of said vessel for introduction of liquid reflux material.

9. Apparatus for the countercurrent contacting of a pair of immiscible liquids of unlike specific gravities, comprising, in combination, an elongated vertically disposed vessel, an assembly of vertically spaced horizontally disposed perforate annular members in said vessel, an assembly of upright, horizontally spaced, perforate concentric members disposed below said assembly of horizontal members, the axis of said concentric members being arranged substantially vertically, an inverted cup closing the central opening of the lowest of said perforate annular members, a conduit leading from the upper end of the concentric member of smallest diameter to the space within said inverted cup, a baffle disposed around the inner edge of each of said horizontally disposed annular members, a baffle disposed around the top edge of each of said concentric members, a nonperforate annular baffle plate forming a seal between the upper end of the outer concentric member of said assembly of concentric members and the inner wall of said vessel, means to introduce one of said liquids at a level near one end of said vessel, means to introduce the other liquid at a level intermediate the level of introduction of said one of said liquids and the other end of said vessel and means to withdraw products from the ends of said vessel.

10. Apparatus for the countercurrent contacting of a pair of immiscible liquids of dissimilar specific gravities, one liquid of said pair of liquids being the major constituent and the other liquid of said pair of liquids being the minor constituent, comprising, in combination, an elongated, vertically disposed vessel, means to introduce said major constituent into said vessel at a level near one end thereof, means to introduce the minor constituent into said vessel at a level intermediate the other end of said vessel and the introduction level of said major constituent, means to introduce liquid reflux material into said vessel at a level intermediate the level of introduction of said minor constituent and said other end of said vessel, an assembly of spaced horizontally disposed perforate annular plates in said vessel, an assembly of perforate concentric members disposed intermediate said assembly of annular plates and said other end of said vessel, a cup having one end open and one end closed, the closed end of said cup filling the opening in the vertically spaced perforate horizontal plate of the assembly of vertically spaced horizontally disposed perforate annular plates nearest said assembly of concentric members, the open end of said cup facing said assembly of concentric members, a conduit leading from the concentric member of smallest diameter of said assembly of concentric members into the open end of said cup, a nonperforate annular baffle plate disposed intermediate the inner wall of said vessel and the end of the perforate concentric member of largest diameter nearest said cup to form a seal between said concentric member of largest diameter and the inner wall of said vessel, and separate means to withdraw liquids from either end of said vessel.

No references cited.